US012688206B2

(12) United States Patent
Zhong et al.

(10) Patent No.: US 12,688,206 B2
(45) Date of Patent: Jul. 21, 2026

(54) USING A DATA MIRROR TO GENERATE SYNTHETIC DATA

(71) Applicant: HSBC SOFTWARE DEVELOPMENT (GUANGDONG) LIMITED, Guangzhou (CN)

(72) Inventors: Galen G. W. Zhong, Foshan (CN); John R. N. Li, Guangzhou (CN); Kevin Y. Wang, Shanghai (CN); Looson S. L. Wu, Guangzhou (CN)

(73) Assignee: HSBC SOFTWARE DEVELOPMENT (GUANGDONG) LIMITED, Guangzhou (CN)

( * ) Notice: Subject to any disclaimer, the term of this patent is extended or adjusted under 35 U.S.C. 154(b) by 0 days.

(21) Appl. No.: 18/870,922

(22) PCT Filed: Dec. 20, 2023

(86) PCT No.: PCT/CN2023/140237
§ 371 (c)(1),
(2) Date: Dec. 2, 2024

(87) PCT Pub. No.: WO2024/164723
PCT Pub. Date: Aug. 15, 2024

(65) Prior Publication Data
US 2025/0355898 A1 Nov. 20, 2025

(51) Int. Cl.
*G06F 16/00* (2019.01)
*G06F 16/28* (2019.01)
*G06F 21/62* (2013.01)

(52) U.S. Cl.
CPC ........ *G06F 16/285* (2019.01); *G06F 21/6227* (2013.01)

(58) Field of Classification Search
CPC ...... G06F 1/1626; G06F 1/1686; G06F 16/90; G06F 16/90335; G06F 17/141;
(Continued)

(56) References Cited

U.S. PATENT DOCUMENTS

| | | | | |
|---|---|---|---|---|
| 10,860,892 | B1 * | 12/2020 | Truong | ................. G06F 3/0644 |
| 2020/0125954 | A1 * | 4/2020 | Truong | ................. G06F 40/205 |

(Continued)

OTHER PUBLICATIONS

International Search Report and Written Opinion issued in corresponding International application PCT/CN2023/140237 mailed Jun. 20, 2024.

*Primary Examiner* — Shyue Jiunn Hwa
(74) *Attorney, Agent, or Firm* — Dentons Durham Jones Pinegar

(57) ABSTRACT
At least one processor may receive a sample data set, determine at least one feature of data in the sample data set, and determine at least one structural characteristic of the sample data set. The at least one processor may determine that at least a portion of the data is categorical data from the at least one feature and the at least one structural characteristic. By operating a machine learning (ML) model, the at least one processor may generate synthetic data having the same at least one feature as the categorical data. The at least one processor may package the synthetic data into a synthetic data set having the same at least one feature and at least one structural characteristic as the sample data set.

20 Claims, 7 Drawing Sheets

(58) Field of Classification Search
CPC .. G06F 2203/0381; G06F 3/013; G06F 3/015;
G06F 3/017; G06F 3/038; G06F 3/147;
G06F 16/248; G06F 9/451; G06F 16/288;
G06F 21/6218; G06F 21/72; G06F 16/27;
G06F 16/958; G10L 15/197; G10L 15/32;
B25J 9/1694; G01N 2800/28; G01N
33/6896; G01N 2800/52; G01N 33/6893;
G01N 2800/2871; G01N 33/575; G01N
33/82; G01N 21/88; G01N 27/447; A61P
35/00; A61P 43/00; A61P 9/10; A61P
3/06; A61P 31/12; A61P 37/02
See application file for complete search history.

(56)                References Cited

U.S. PATENT DOCUMENTS

2021/0365471 A1* 11/2021 O'Hara ................... G06F 16/26
2022/0156177 A1    5/2022 Levacher et al.

* cited by examiner

200

300

302 – select schema based and/or data based generation

304 – configure schema

306 – configure data source

308 – configure output parameters

310 – configure output destination

312 – examine data quality

400

500

502 – designate numerical columns as categorical

504 – designate remaining columns with value occurrence below threshold as categorical 506 – designate remaining columns as uncategorical 508 – determine patterns for uncategorical columns 510 – link columns

600

USING A DATA MIRROR TO GENERATE SYNTHETIC DATA

CROSS-REFERENCE TO RELATED APPLICATION

This application is a national phase application under 35 U.S.C. § 371 of International Application No. PCT/CN2023/140237, filed Dec. 20, 2023, the contents of which is incorporated into the present application by reference.

BACKGROUND

Data sharing often comes with privacy and security concerns. For example, concerns about cross-border data sharing have been intensifying due to the increasing prevalence of data localization regulations. This has led to challenges in sharing real data with external partners for research and development purposes, such as training fraud analytics models using payment data in machine learning applications. At the same time, as real data becomes more difficult to share, obtaining high-quality testing data to facilitate development and testing cycles presents a significant challenge.

SUMMARY OF THE DISCLOSURE

Some embodiments described herein may provide a method comprising receiving, by at least one processor, a sample data set; determining, by the at least one processor, at least one feature of data in the sample data set; determining, by the at least one processor, at least one structural characteristic of the sample data set; determining, by the at least one processor, that at least a portion of the data is categorical data from the at least one feature and the at least one structural characteristic; generating, by the at least one processor operating a machine learning (ML) model, synthetic data having the same at least one feature as the categorical data; and packaging, by the at least one processor, the synthetic data into a synthetic data set having the same at least one feature and at least one structural characteristic as the sample data set.

In some embodiments, the method may further comprise determining, by the at least one processor, that at least a second portion of the data is uncategorical data from the at least one feature and the at least one structural characteristic; generating, by the at least one processor, second synthetic data corresponding to the second portion of the data by a pseudorandom or random process; and packaging, by the at least one processor, the second synthetic data into the synthetic data set. In some embodiments, the generating of the second synthetic data may comprise specifying at least one rule for the second synthetic data, and the pseudorandom or random process is configured to generate second synthetic data complying with the at least one rule.

In some embodiments, the method may further comprise linking, by the at least one processor, at least two separate sections of the sample data set, wherein the generating may comprise operating the ML model to generate synthetic data according to same input parameters for the linked at least two separate sections. In some embodiments, the linking may comprise determining the at least two separate sections have a similarity in at least one feature above a threshold similarity value.

In some embodiments, the generating may comprise specifying at least one rule for the synthetic data, and the ML model may be configured to generate synthetic data complying with the at least one rule. In some embodiments, the generating may comprise determining that the synthetic data complies with at least one quality standard.

In some embodiments, the receiving may comprise scanning data at a specified path. In some embodiments, the receiving may comprise iterating through the data scanned at the specified path to thereby assemble the sample data set.

In some embodiments, the method may further comprise distributing, by the at least one processor, the synthetic data set to at least one remote receiver.

Some embodiments described herein may comprise a system comprising at least one processor and at least one non-transitory memory in communication with the at least one processor and storing instructions that, when executed by the at least one processor, cause the at least one processor to perform processing. The processing may comprise receiving a sample data set; determining at least one feature of data in the sample data set; determining at least one structural characteristic of the sample data set; determining that at least a portion of the data is categorical data from the at least one feature and the at least one structural characteristic; generating, by operating a machine learning (ML) model, synthetic data having the same at least one feature as the categorical data; and packaging the synthetic data into a synthetic data set having the same at least one feature and at least one structural characteristic as the sample data set.

In some embodiments, the processing may further comprise determining that at least a second portion of the data is uncategorical data from the at least one feature and the at least one structural characteristic; generating second synthetic data corresponding to the second portion of the data by a pseudorandom or random process; and packaging the second synthetic data into the synthetic data set. In some embodiments, the generating of the second synthetic data may comprise specifying at least one rule for the second synthetic data, and the pseudorandom or random process may be configured to generate second synthetic data complying with the at least one rule.

In some embodiments, the processing may further comprise linking at least two separate sections of the sample data set, wherein the generating may comprise operating the ML model to generate synthetic data according to same input parameters for the linked at least two separate sections. In some embodiments, the linking may comprise determining the at least two separate sections have a similarity in at least one feature above a threshold similarity value.

In some embodiments, the generating may comprise specifying at least one rule for the synthetic data, and the ML model may be configured to generate synthetic data complying with the at least one rule. In some embodiments, the generating may comprise determining that the synthetic data complies with at least one quality standard.

In some embodiments, the receiving may comprise scanning data at a specified path. In some embodiments, the receiving may comprise iterating through the data scanned at the specified path to thereby assemble the sample data set.

In some embodiments, the processing may further comprise distributing the synthetic data set to at least one remote receiver.

BRIEF DESCRIPTIONS OF THE DRAWINGS

DETAILED DESCRIPTION OF SEVERAL EMBODIMENTS

Embodiments described herein can utilize production data for training machine learning (ML) models, subsequently generating high-quality synthetic data that closely resembles real data in aspects like metadata consistency, data distribution, and data linkage. The generated data can be shared and used globally without legal or compliance concerns. As described in detail below, the techniques by which the synthetic data is generated may be sufficiently advanced and technically sophisticated to generate data that can be as useful as real data from a functional training standpoint.

Embodiments described herein may include an intuitive self-service portal, enabling users without any programming background to effortlessly configure various data sources such as inputs and establish corresponding target data stores. By creating connections between source and target systems, users can facilitate seamless data pipelines. To that end, embodiments described herein may combine a sophisticated self-service portal with advanced systems and methods that may learn from production data to generate high-quality synthetic data while eliminating the need and risk of using production data for testing and model training. These embodiments may support both on-premises and cloud-based environments and may enable the establishment of sandbox environments populated with high-quality synthetic data, empowering data scientists to efficiently explore data, construct, and train models. Synthetic data generated as described herein may be automatically distributed to user-defined destinations, providing a convenient experience that eliminates the need for users to manually move applications or data. The portal may further enable users to assess the quality of the synthetic data generated in some embodiments.

Figure 1:
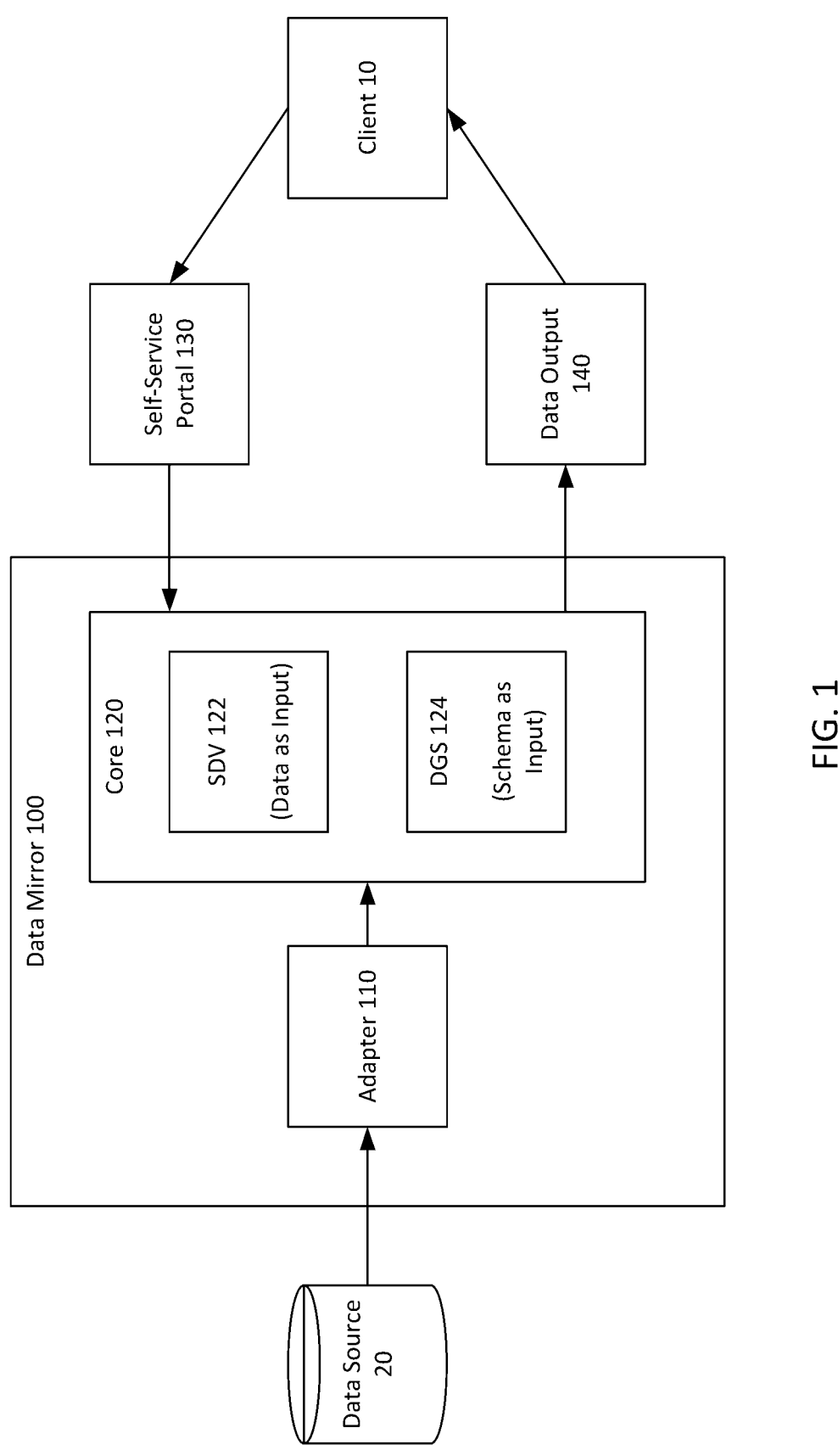
FIG. 1 shows an example data mirror system according to some embodiments of the disclosure.

FIG. 1 shows an example data mirror 100 system according to some embodiments of the disclosure. The system can include data mirror 100 (including adapter 110 and core 120), self-service portal 130, and/or data output 140 and may interact with client 10 and/or data source 20. Illustrated components may include a variety of hardware, firmware, and/or software components that interact with one another. The elements of FIG. 1 are described in greater detail below, but in general, data mirror 100 may receive data from client 10 via self-service portal 130 and/or from data source 20 and process the data to produce high-quality synthetic data provided as data output 140. Some components shown in FIG. 1 may communicate with one another using networks. For example, client 10 may access self-service portal 130 through one or more networks (e.g., the Internet, an intranet, and/or one or more networks that provide a cloud environment). In another example, data mirror 100 may use the one or more networks to obtain data from data source 20. Each component may be implemented by one or more computers (e.g., as described below with respect to FIG. 7).

As described in detail below, data mirror 100 may include adapter 110 and core 120. Adapter 110 may be configured to read and process real data to be mirrored from data source 20. Core 120 may generate the synthetic data based on the real data and/or based on an input schema. For instances where the synthetic data is based on real data, core 120 may operate a synthetic data vault (SDV) module 122 to generate the data. For instances where the synthetic data is based on a schema, core 120 may operate a data generation service (DGS) module 124 to generate the data. For example, FIGS. 2-6 illustrate the functioning of the illustrated components in detail.

Elements illustrated in FIG. 1 (e.g., data mirror 100 including adapter 110 and core 120 (which may include SDV 122 and/or DGS 124), self-service portal 130 (which may be a component of data mirror 100 or may be provided by a separate service), client 10, and/or data source 20) are each depicted as single blocks for ease of illustration, but those of ordinary skill in the art will appreciate that these may be embodied in different forms for different implementations. For example, while data mirror 100 and self-service portal 130 are depicted separately, any combination of these elements may be part of a combined hardware, firmware, and/or software element. Likewise, while adapter 110 and core 120 are depicted as parts of a single data mirror 100 element, any combination of these elements may be distributed among multiple logical and/or physical locations. Indeed, the disclosed embodiments provide improvements to distributed computing arrangements. Also, while one client 10, one data source 20, one data mirror 100, one self-service portal 130, and one data output 140 are illustrated, this is for clarity only, and multiples of any of the above elements may be present. In practice, there may be single instances or multiples of any of the illustrated elements, and/or these elements may be combined or co-located.

In the following descriptions of how the illustrated components function, several examples are presented, including examples using specific data or data types. However, those of ordinary skill in the art will appreciate that these examples are merely for illustration, and the disclosed embodiments are extendable to other application and data contexts.

Figure 2:
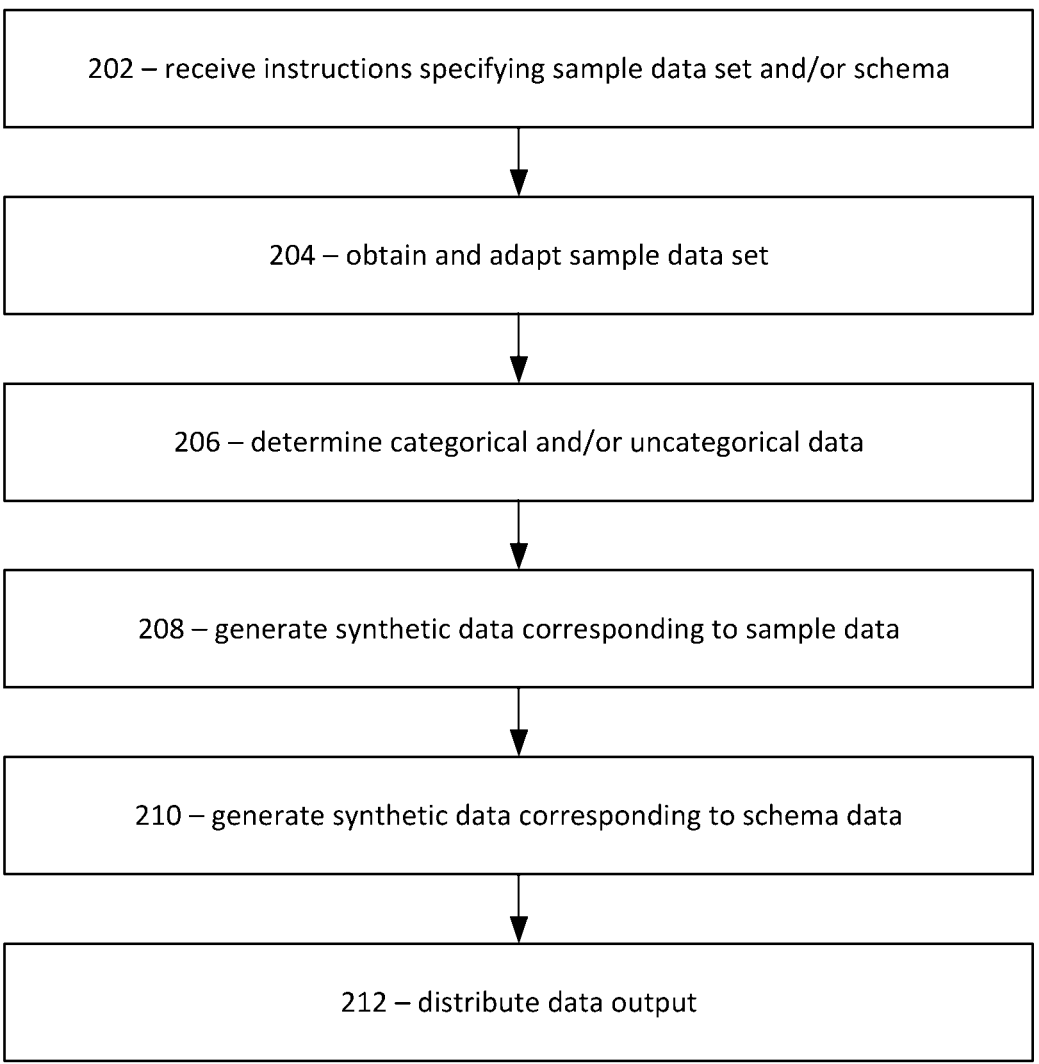
FIG. 2 shows an example synthetic data generation process according to some embodiments of the disclosure.

FIG. 2 shows an example synthetic data generation process 200 according to some embodiments of the disclosure. Data mirror 100, along with other elements shown in FIG. 1 in some embodiments, can perform process 200 to generate synthetic data having similar characteristics as real data but not containing any of the actual information within the real data. Accordingly, process 200 can provide synthetic data for training and/or remote sharing without compromising the security of the real data. For example, synthetic data can be used to train an ML model to work with the real data without being exposed to the real data.

At 202, data mirror 100 can receive instructions to create synthetic data from a user of client 10 through self-service portal 130 or some other route. For example, the instructions may specify a sample data set of real data and/or a data schema on which data mirror 100 may base the synthetic data.

Figure 3:
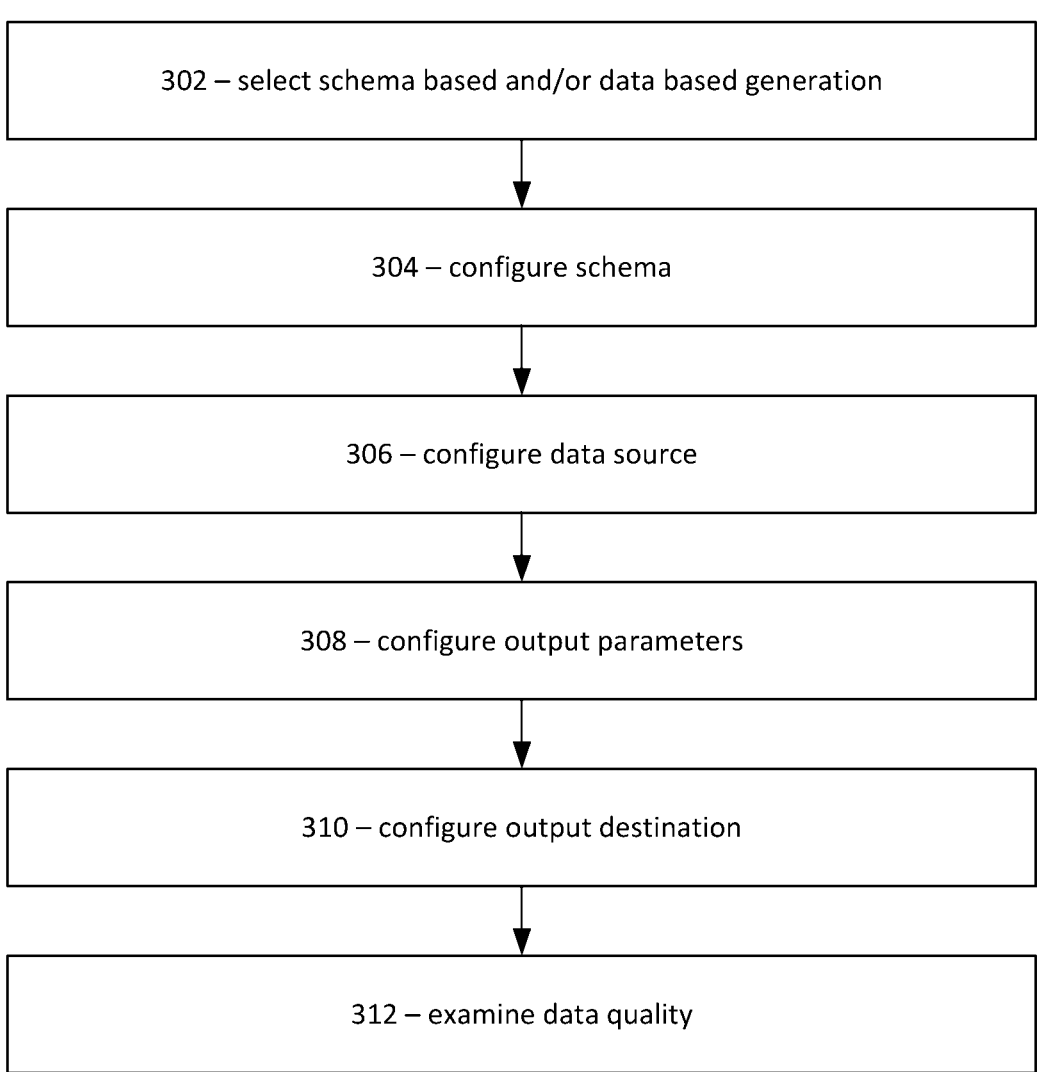
FIG. 3 shows an example setup process according to some embodiments of the disclosure.

For example, FIG. 3 shows an example setup process 300 according to some embodiments of the disclosure. Self-service portal 130 may perform setup process 300 to generate instructions and provide the instructions to data mirror 100. A user of client 10 may log in with self-service portal 130 in any manner known to those of ordinary skill in the art and begin providing information used by self-service portal 130 to generate the instructions.

At 302, self-service portal 130 may receive user input regarding the synthetic data to be created. For example, a user may be an employee of a company that has offices in many countries and/or that partners with many other entities throughout the world. Offshore offices and/or partners may work with the company to supply ML models for the company, and these models may need to be trained on data that resembles company data but that is exportable to offshore locations. In another example, the user may want to train a model using data that includes private information that should not be shared. Through a user interface (UI) provided by self-service portal 130, the user can designate a data source 20 on which synthetic data is to be based, which may include specifying a data location, data type, data source, data structure, and/or other parameters. In some embodiments, the user can use self-service portal 130 to indicate data categories or columns that should be linked, as described in detail below.

Data received at 302 may include a user selection of schema based generation, data based generation, or a combination thereof. For example, if the user is aware of a sample data set on which the synthetic data is to be based, the user may select data based generation. If the user does not have a sample data set and/or would otherwise like to specify a schema for the data instead, the user may select schema based generation. In some embodiments, it may be possible for some portions of the synthetic data to be schema based and other portions of the synthetic data to be data based.

At 304, self-service portal 130 may configure the schema if the synthetic data is to be wholly or partially schema based according to the selection received at 302. The schema may include, but is not limited to, table names, column names, data types for each table, data types for each column, primary key designation, foreign key designation, number of records per table, and/or other features. The schema features may be specified by user input and/or may be automatically specified by self-service portal 130 (e.g., by default or by user request for random or automatic selection of features).

At 306, self-service portal 130 may configure the data source if the synthetic data is to be wholly or partially data based according to the selection received at 302. For example, data source 20 location and access rights (e.g., username, password, JSON keys, etc.) may be provided by the user.

At 308, self-service portal 130 may configure output parameters for the synthetic data to be generated. For example, in some embodiments, the user may provide a designation of a table to be generated, table configuration (e.g., column data types, table linkages, etc.), pipeline, etc. In some embodiments, the table to be generated, table configuration, and/or pipeline may be automatically specified by self-service portal 130 (e.g., by default or by user request for random or automatic selection of features).

At 310, self-service portal 130 may configure one or more output destinations for data output 140, which may include the synthetic data to be generated. For example, the user may specify a location where data output 140 is to be stored or sent. In some embodiments, the location may be automatically specified by self-service portal 130 (e.g., by default or by user request for random or automatic selection of features).

After processing at 310, instructions may be sent to data mirror 100. FIG. 3 also shows an option that may be performed after the synthetic data is generated. Specifically, at 312, self-service portal 130 may examine data quality of the synthetic data generated as described below. For example, the user may optionally specify one or more quality rules, and self-service portal 130 and/or data mirror 100 may generate a data quality report, which the user may access through self-service portal 130.

Returning to FIG. 2, at 204, data mirror 100 may obtain and adapt a sample data set according to the instructions received at 202. For example, adapter 110 may communicate with data source 20 specified in the instructions received at 202 and assemble the sample data from information obtained from data source 20.

Figure 4:
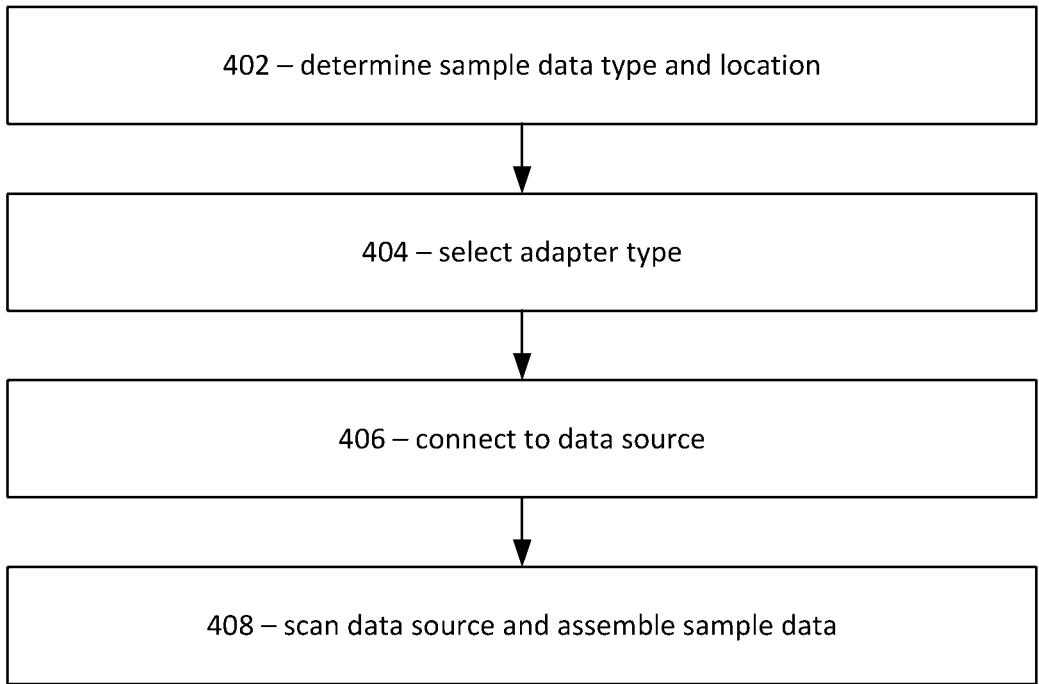
FIG. 4 shows an example sample data intake process according to some embodiments of the disclosure.

For example, FIG. 4 shows an example sample data intake process 400 according to some embodiments of the disclosure. Adapter 110 and/or other components as indicated below may perform sample data intake process 400 in response to data mirror 100 receiving data source 20 parameters from self-service portal 130 (e.g., as described above at 306 of process 300). Through performance of process 400, data mirror 100 may receive a sample data set in some embodiments.

At 402, adapter 110 may determine sample data type and location. For example, adapter 110 may receive data source 20 parameters from self-service portal 130 (e.g., as described above at 306 of process 300). These parameters may include a path for data source 20 (e.g., gsi/abc/123/read_data/) (which may inherently define the data type in some embodiments), an explicit definition of the data type, and/or any required access data (e.g., JSON key required to access data at the path).

At 404, adapter 110 may select an adapter type from a plurality of available adapter types in accordance with the data type from 402. Each respective adapter type may include a set of instructions for connecting with, and obtaining data from, a data source 20 having a respective data type. For example, adapter types may include, but are not limited to, an Oracle adapter, a Sybase adapter, a Hadoop (e.g., HDFS) adapter, a MongoDB adapter, a PostgreSQL (e.g., PgDB) adapter, a Google Cloud (e.g., GCS) adapter, an ElasticSearch adapter, and/or others. Each adapter type may include instructions specific to data sources 20 of its data type. Accordingly, by selecting an adapter type specific to data source 20, adapter 110 can provision itself with a complete set of instructions for obtaining data from data source 20. This can allow data mirror 100 to connect with any data source 20 of any type without requiring a user to provide connection instructions beyond data location, data type, and any required access data. Moreover, a skilled user configuring or updating adapter 110 may only need to prepare generic adapter types once each, rather than having to rewrite connection instructions every time a new specific data source 20 is used.

At 406, adapter 110 may connect to data source 20. For example, adapter 110 may connect to data source 20 at the path given at 402 and using the adapter type identified at 404 and, if necessary, supply access data as determined at 402. While navigating to a path and providing a JSON key are presented as examples, it will be appreciated by those of ordinary skill that adapter 110 may use any technique or system required to establish a connection to data source 20 without departing from the scope of process 400.

At 408, adapter 110 may scan data source 20 and assemble initial sample data. That is, adapter 110 may scan data at the specified path and iterate through the data scanned at the specified path to thereby assemble a sample data set. For example, adapter 110 may use Java Apache Spark or another test package to determine the structure of the data in data source 20. Adapter 110 may iterate through the structure (e.g., per table, column, cell, etc.) and assemble the sample data set. The sample data set may be a representation of the data from data source 20 in some standardized format, such as a binary data set. By determining the structure of the data and iterating through the structure of the data, rather than simply importing the data, adapter 110 may assemble initial sample data sets having consistent form regardless of data source 20 data type or adapter type used.

For example, an implementation of data intake process 400 may proceed as follows. Adapter 110 may receive a path, a JSON key, and an indication that data source 20 is a GCS source from self-service portal 130. Adapter 110 may load the GCS adapter type and connect to data source 20 at the given path and using the given JSON key. Adapter 110 may iterate through the path and find all tables in the path. For each table, adapter 110 may use Java Apache Spark to scan data at the given path and determine table properties and structures (e.g., number of rows, number of columns, data type per column, etc.). Adapter 110 may build an initial sample data set having the same structure and data. Adapter 110 may store the metadata (e.g., table/pipeline configuration, data quality configuration, model file in binary form per table, etc.) in a relational database or other memory for further processing as described below.

In some embodiments, data intake process 400 may be a scheduled task. For example, a user of self-service portal 130 may schedule times and/or frequencies (e.g., daily, weekly, monthly, etc.) for performing data intake process 400 on a given data source 20. Adapter 110 may then perform data intake process 400 as scheduled, for example to update the sample data set for use in ML retraining.

Returning to FIG. 2, at 206, data mirror 100 may determine categorical and/or uncategorical data of the sample data set. In the context of the disclosed embodiments, categorical data may be any kind of data that is categorical in nature, which may include numerical and/or datetime data in some embodiments. Some example embodiments may categorize all categorical data as such generally, while other embodiments may specifically designate some (e.g., numerical and/or datetime) data as labeled types of categorical data, as described below. Data mirror 100 may determine at least one feature of data in the sample data set and/or at least one structural characteristic of the sample data set from 204. Data mirror 100 may determine a portion of the data that is categorical as described herein and/or a portion of the data that is uncategorical data from the at least one feature and/or at least one structural characteristic.

Figure 5:
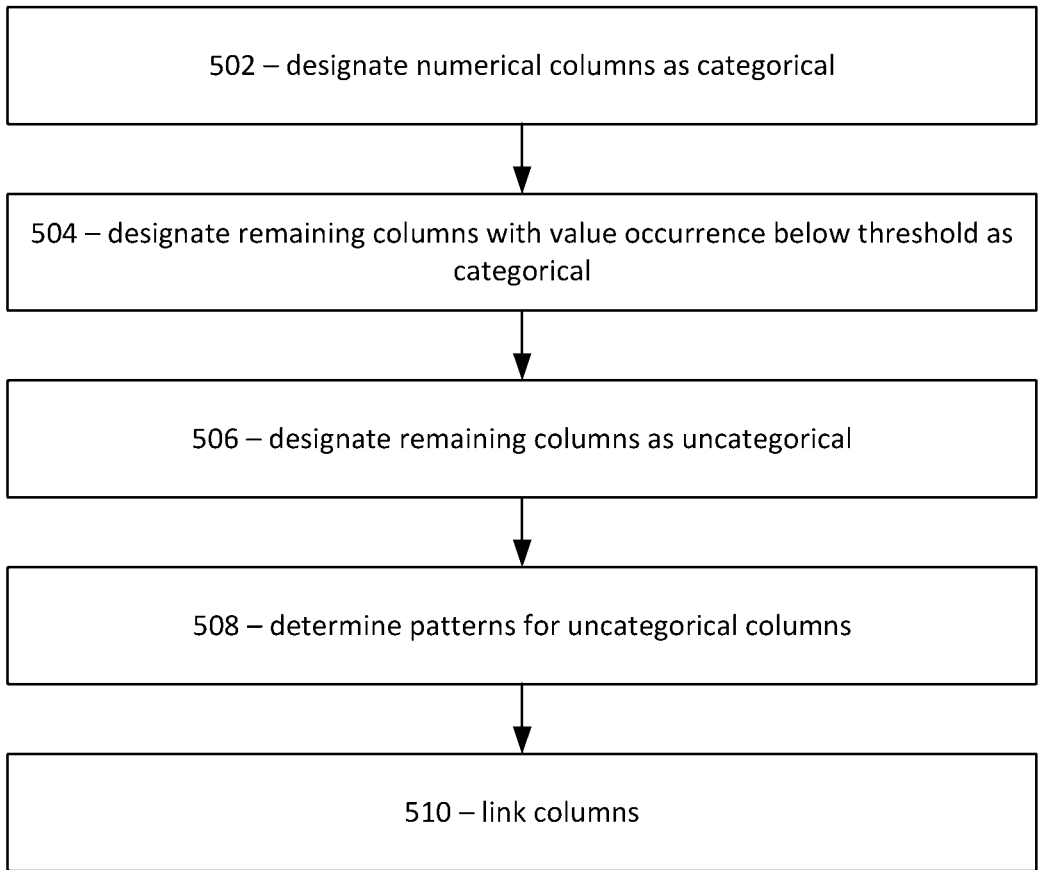
FIG. 5 shows an example sample data analysis process according to some embodiments of the disclosure.

For example, FIG. 5 shows an example sample data analysis process 500 according to some embodiments of the disclosure. Core 120 and/or other components as indicated below may perform sample data analysis process 500 on the sample data set (e.g., as generated by sample data intake process 400 as described above). By performing sample data analysis process 500, core 120 may identify categorical and uncategorical data. Categorical and uncategorical data may be processed differently to produce synthetic data (e.g., uncategorical data may be generated randomly, while categorical data may be generated using an ML process), so sample data analysis process 500 can enable efficient processing during synthetic data creation.

At 502, core 120 may designate numerical and/or datetime columns as containing categorical data. Core 120 may read the data in the columns of the initial sample data set to identify columns containing only numerical entries. Core 120 may designate such columns as containing categorical data, as purely numerical data may be regarded as categorical. In some embodiments, such columns may be designated more specifically as "numerical" rather than broadly as "categorical." Likewise, core 120 may read the data in the columns of the initial sample data set to identify columns containing only datetime entries. Core 120 may designate such columns as containing categorical data, as pure datetime data may be regarded as categorical. In some embodiments, such columns may be designated more specifically as "datetime" rather than broadly as "categorical."

At 504, core 120 may designate remaining columns as categorical and/or as specific categorical types (e.g., numerical, datetime, etc.) in response to value occurrence counts within being below a threshold. As noted above, core 120 may read the data in the columns of the initial sample data set. Core 120 may identify columns having relatively few, possibly recurring, values. For example, core 120 may determine a count of unique values in a column. Core 120 may compare the count with a threshold. Counts below the threshold may indicate categorical data, wherein a relatively small number of data options are possible. Core 120 may designate any column having a count of unique values therein below the threshold as categorical. For example, if a column has one million entries, and there are ten unique values present in the column, the data in the column is likely categorical and may be designated as such by core 120. In some embodiments, this process may be performed globally for all categorical data. In other embodiments wherein specific types of categorical data (e.g., numerical, datetime, etc.) are designated as described above, core 120 may analyze each likely categorical column to determine whether the number of value occurrences which could be parsed as a specific type (e.g., numerical, datetime, etc.) are above a threshold within the column. For example, core 120 may designate categorical columns having a number of entries conforming to a datetime format over a threshold count value as datetime columns in such embodiments.

At 506, core 120 may designate remaining columns as uncategorical. In other words, any column having a count of unique values therein above the threshold may be uncategorical, as the high count of unique values may indicate that a relatively high number of data options are possible (e.g., approaching random levels of options in some cases).

At 508, core 120 may determine patterns for uncategorical columns. For each column, core 120 may determine whether the data therein is boolean data, string data, etc., and core 120 may determine features of some data types (e.g., string format, such as number of characters, for string data, etc.). As described below, synthetic data based on uncategorical data may be generated randomly, but to have the same pattern as the real data on which it is based.

At 510, core 120 may link columns as appropriate. Linking columns may cause counterpart columns in the synthetic data set to have the same or substantially same data. This may be done if the columns in the real data have same or substantially same data. For example, if a user indicated columns are to be linked via self-service portal 130 because they want the end result to have same data across linked columns, core 120 may link those indicated columns.

Core 120 may automatically link some columns in some embodiments. For example, core 120 may compare columns and thereby determine that at least two separate columns have a similarity in at least one feature above a threshold similarity value. For example, core 120 may employ an autodetection threshold such that any two columns having similarity in content above the threshold may be linked. For example, two columns having a percentage of identical entries above a threshold percentage may be linked.

As described in detail below, as a result of linking at least two separate sections of the sample data set, subsequently generating synthetic data by operating an ML model may generate synthetic data according to same input parameters for the linked at least two separate sections.

Returning to FIG. 2, at 208, data mirror 100 may generate synthetic data corresponding to sample data. For example, data mirror 100 can generate data using an ML model for categorical data (or multiple ML models for different types (e.g., one each for numerical, categorical, and datetime), as described below) and/or generate data randomly and/or pseudorandomly for uncategorical data.

Figure 6:
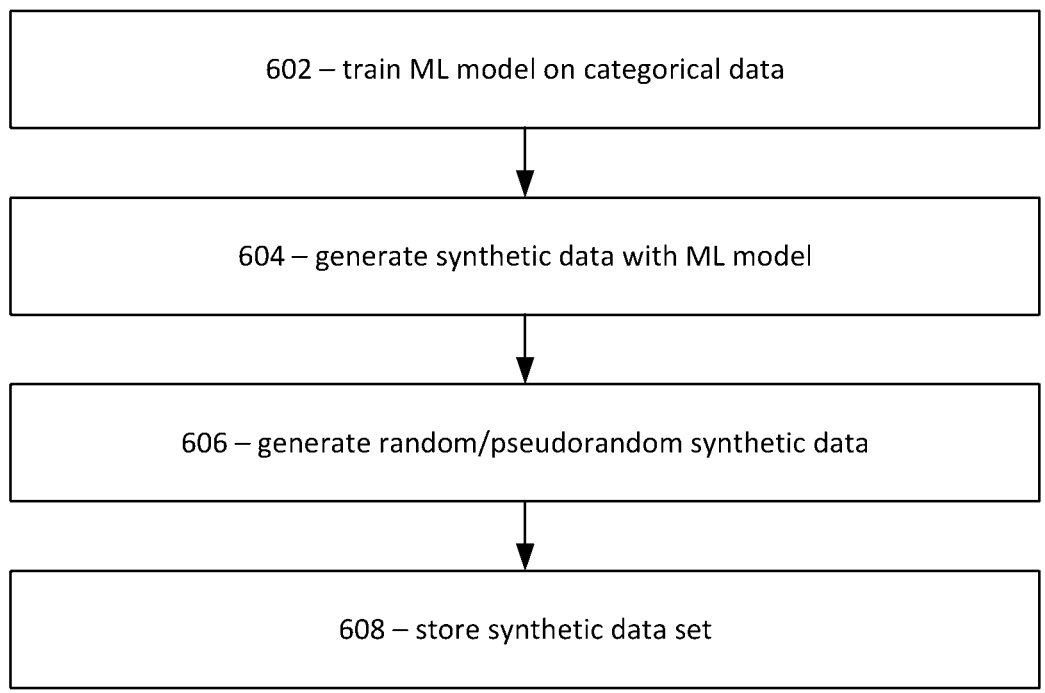
FIG. 6 shows an example synthetic data generation process according to some embodiments of the disclosure.

FIG. 6 shows an example synthetic data generation process 600 according to some embodiments of the disclosure. By performing synthetic data generation process 600, data mirror 100 may generate, using an ML model or ML models, synthetic data having a same at least one feature as the categorical data, generate second synthetic data corresponding to uncategorical data by a pseudorandom or random process, and package the synthetic data into a synthetic data set having same features and structural characteristics as the sample data set.

At 602, data mirror 100 may train an ML model on categorical data (e.g., as identified at 504 in sample data analysis process 500 as described above). The ML model may be a model configured to generate synthetic data natively, such as SDV 122 ML model. SDV 122, for example, is an ML model that can create synthetic data based on data patterns and table relationships. Accordingly, data mirror 100 may train SDV 122 on the categorical data, which may inherently include the data patterns and table relationships of the real data from data source 20. While SDV is the model used in this example, those of skill in the art will appreciate that other models (e.g., Faker, Gretel, etc.) may be used without departing from the scope of process 600. In embodiments wherein multiple types of categorical data are identified (e.g., categorical, numerical, and/or datetime), SDV 122 may be trained generally on all such data at once, or separate instances of SDV 122 may be trained to produce each separate type of data.

At 604, data mirror 100 may generate synthetic data with the trained ML model. Data mirror 100 may run SDV 122 to generate synthetic data as output data and, due to the training at 602, the synthetic data as output data will have a similar pattern to the categorical data. Moreover, in some embodiments, data mirror 100 may specify at least one rule for generating the synthetic data, and SDV 122 may generate the synthetic data to comply with the at least one rule. For example, as noted above, any columns that have been linked may have similar data patterns among themselves in the resulting synthetic data or may be made to be identical to one another in the resulting synthetic data.

At 606, data mirror 100 may generate random or pseudorandom synthetic data for uncategorical data. For example, data mirror 100 may specify at least one rule for the random or pseudorandom synthetic data, and data mirror 100 may generate second synthetic data complying with the at least one rule. Here, such rules may correspond to the sample data patterns (e.g., as determined at 508 of sample data analysis process 500). Rules may specify string format, number of characters, etc. for some or all data columns. Data mirror 100 may generate the random or pseudorandom synthetic data in accordance with any rules that may have been specified.

At 608, data mirror 100 may store the synthetic data set. For example, data mirror 100 may store the generated synthetic data as all or part of data output 140.

Returning to FIG. 2, at 210, data mirror 100 may generate synthetic data corresponding to schema data. For example, as discussed above, a user may indicate a schema according to which the synthetic data is to be generated. In this case, DGS 124 may generate random or pseudorandom data according to the indicated schema. For example, DGS 124 may build a data structure having tables and/or subcomponents matching the schema. Then, DGS 124 may populate the data structure with generated synthetic data (e.g., random or pseudorandom data). Data mirror 100 may store the generated synthetic data as all or part of data output 140.

While FIG. 2 presents generating synthetic data corresponding to sample data at 208 and generating synthetic data corresponding to schema data at 210 as part of the same process 200, it should be understood that actual generation of synthetic data can vary depending on user inputs to self-service portal 130. For example, if the user supplies information indicating sample data from data source 20 as the sole basis for the synthetic data, data mirror 100 may only generate synthetic data corresponding to sample data at 208. Alternatively, if the user supplies a schema description as the sole basis for the synthetic data, data mirror 100 may only generate synthetic data corresponding to schema data at 210. In some embodiments, it may be possible for the user to both provide sample data and schema data, in which case data mirror 100 may generate synthetic data at 208 and 210 for different portions of the overall sample data set.

The result of processing at 202-210 may be data output 140, which may include the synthetic data set produced by data mirror 100. At 212, data mirror 100 may distribute data output 140. For example, data mirror 100 may send, or make available, data output 140 to at least one remote receiver such as client 10 or some other device. Because data output 140 contains synthetic data, and not the original data within data source 20, data output 140 may be safe and legal to distribute to any remote receiver.

In some embodiments, either prior to, concurrent with, or after distribution, data mirror 100 may determine that the synthetic data in data output 140 complies with at least one quality standard. For example, self-service portal 130 may provide users with options to select one or more data quality parameters to test and/or one or more rules for the respective parameters. For example, data may be tested for conformity, validity, uniqueness, distribution, etc.; and rules may specify thresholds or other criteria for such tests. In some embodiments, such tests may be performed automatically without user request. In any event, data mirror 100 may configure Java Apache Spark or another test package to perform the tests as directed. Data mirror 100 may provide a report on data quality through self-service portal 130 and/or other distribution vectors.

Figure 7:
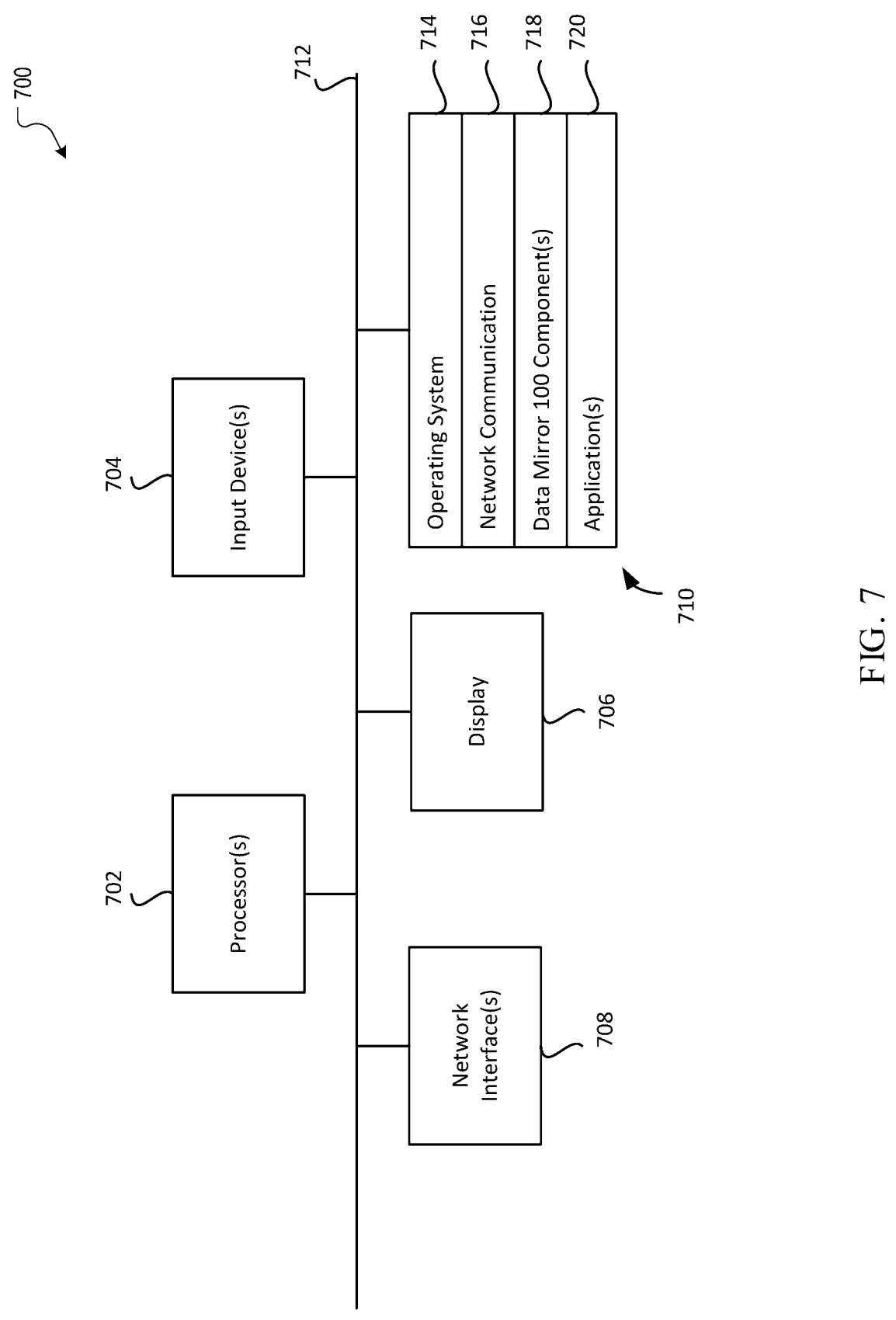
FIG. 7 shows an example computing device according to some embodiments of the disclosure.

FIG. 7 shows a computing device 700 according to some embodiments of the disclosure. For example, computing device 700 may function as data mirror 100 and/or self-service portal 130 and/or any portion(s) thereof, or multiple computing devices 700 may function as data mirror 100 and/or self-service portal 130 and/or any portion(s) thereof.

Computing device 700 may be implemented on any electronic device that runs software applications derived from compiled instructions, including without limitation personal computers, servers, smart phones, media players, electronic tablets, game consoles, email devices, etc. In some implementations, computing device 700 may include one or more processors 702, one or more input devices 704, one or more display devices 706, one or more network interfaces 708, and one or more computer-readable mediums 710. Each of these components may be coupled by bus 712, and in some embodiments, these components may be distributed among multiple physical locations and coupled by a network.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, and touch-sensitive pad or display. Bus 712 may be any known internal or external bus technology, including but not limited to ISA, EISA, PCI, PCI Express, NuBus, USB, Serial ATA or FireWire. In some embodiments, some or all devices shown as coupled by bus 712 may not be coupled to one another by a physical bus, but by a network connection, for example. Computer-readable medium 710 may be any medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 may include various instructions 714 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 may establish and maintain network connections (e.g., software for implementing communication protocols, such as TCP/IP, HTTP, Ethernet, telephony, etc.).

Data mirror 100 component(s) 718 may include instructions for performing the processing described herein. For example, data mirror 100 component(s) 718 may provide instructions for performing any and/or all of processes 200, 300, 400, 500, and/or 600 as described above. Application(s) 720 may be an application that uses or implements the outcome of processes described herein and/or other processes. In some embodiments, the various processes may also be implemented in operating system 714.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In some cases, instructions, as a whole or in part, may be in the form of prompts given to a large language model or other machine learning and/or artificial intelligence system. As those of ordinary skill in the art will appreciate, instructions in the form of prompts configure the system being prompted to perform a certain task programmatically. Even if the program is non-deterministic in nature, it is still a program being executed by a machine. As such, "prompt engineering" to configure prompts to achieve a desired computing result is considered herein as a form of implementing the described features by a computer program.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method, comprising:
   receiving, by at least one processor operating a machine learning (ML) model, a sample data set and associated data;
   determining, by the at least one processor, at least one feature of the data associated with the sample data set;
   determining, by the at least one processor, at least one structural characteristic of the sample data set;
   determining, by the at least one processor, and based, at least in part, on one or more of the at least one feature of the data associated with the sample data set and the at least one structural characteristic of the sample data set, that at least a portion of the data associated with the sample data set is categorical data, the categorical data having a categorical data feature;
generating, by the at least one processor, synthetic data, the synthetic data having the same categorical data feature as the categorical data;
   packaging, by the at least one processor, the synthetic data into a synthetic data set, the synthetic data set having the same at least one feature and the same at least one structural characteristic as the sample data set; and
   distributing, by the at least one processor, the synthetic data set to at least one remote receiver.

2. The method of claim 1, further comprising:
determining, by the at least one processor, and based, at least in part, on one or more of the at least one feature of the data associated with the sample data set and the at least one structural characteristic of the sample data set, that at least a second portion of the data is uncategorical data;
   generating, by the at least one processor, second synthetic data corresponding to the second portion of the data by at least one of pseudorandom process and a random process; and
   packaging, by the at least one processor, the second synthetic data into the synthetic data set.

3. The method of claim 2, wherein generating the second synthetic data comprises specifying at least one rule for the second synthetic data and wherein the at least one of the pseudorandom process and the random process generates the second synthetic data while complying with the at least one rule.

4. The method of claim 1, further comprising linking, by the at least one processor, at least two separate sections of the sample data set.

5. The method of claim 4, wherein the linking comprises determining whether the at least two separate sections have a similarity in at least one feature above a threshold similarity value.

6. The method of claim 1, wherein the generating comprises specifying at least one rule for the synthetic data and wherein the ML model generates the synthetic data while complying with the at least one rule.

7. The method of claim 1, wherein the generating comprises determining whether the synthetic data conforms with a threshold conformity requirement with respect to the sample data set.

8. The method of claim 1, wherein the determining that the at least the portion of the data associated with the sample data set is categorical data comprises determining that at least a portion of the categorical data is at least one of numerical data and datetime data from the at least one feature.

9. The method of claim 8, wherein the receiving comprises iterating through data scanned at a specified path to assemble the sample data set.

10. A system, comprising:
    at least one processor; and
    at least one non-transitory memory in communication with the at least one processor and storing instructions that, when executed by the at least one processor, perform operations, comprising:
    receiving a sample data set and associated data;
    determining at least one feature of the data associated with the sample data set;
    determining at least one structural characteristic of the sample data set;
    determining based, at least in part, on one or more of the at least one feature of the data associated with the sample data set and the at least one structural characteristic of the sample data set, that at least a portion of the data is categorical data, the categorical data having a categorical data feature;
    generating, by a machine learning (ML) model, synthetic data, the synthetic data having the same categorical data feature as the categorical data;
    packaging the synthetic data into a synthetic data set, the synthetic data set having the same at least one feature and the same at least one structural characteristic as the sample data set; and
    distributing the synthetic data set to at least one remote receiver.

11. The system of claim 10, wherein the operations further comprise:

determining based, at least in part, on one or more of the at least one feature of the data associated with the sample data set and the at least one structural characteristic of the sample data set, that at least a second portion of the data is uncategorical data;

generating second synthetic data corresponding to the second portion of the data by at least one of pseudorandom process and a random process; and packaging the second synthetic data into the synthetic data set.

12. The system of claim 11, wherein generating the second synthetic data comprises specifying at least one rule for the second synthetic data and wherein the at least one of the pseudorandom process and the random process generates the second synthetic data while complying with the at least one rule.

13. The system of claim 10, wherein the operations further comprise linking at least two separate sections of the sample data set.

14. The system of claim 13, wherein the linking comprises determining whether the at least two separate sections have a similarity in at least one feature above a threshold similarity value.

15. The system of claim 10, wherein the generating comprises specifying at least one rule for the synthetic data and wherein the ML model generates the synthetic data while complying with the at least one rule.

16. The system of claim 10, wherein the generating comprises determining whether the synthetic data conforms with a threshold conformity requirement with respect to the sample data set.

17. The system of claim 10, wherein the determining that the at least the portion of the data associated with the sample data set is categorical data comprises determining that at least a portion of the categorical data is at least one of numerical data and datetime data from the at least one feature.

18. The system of claim 17, wherein the receiving comprises iterating through data scanned at a specified path to assemble the sample data set.

19. A system, comprising:

at least one processor; and a memory device communicatively coupled to the at least one processor and storing instructions that, when executed by the at least one processor, perform operations, comprising:

determining a feature associated with a sample data set;

determining a structural characteristic of the sample data set;

determining based, at least in part, on at least one of the feature of the sample data set and the structural characteristic of the sample data set, whether at least a portion of the data is categorical data based, at least in part, on determining the at least the portion of data is categorical data:

determining a categorical data feature;

generating synthetic data, the synthetic data having the categorical data feature;

packaging the synthetic data into a synthetic data set, the synthetic data set having the feature associated with the sample data set and the structural characteristic associated the sample data set; and distributing the synthetic data set.

20. The system of claim 19, wherein the operations further comprise:

determining based, at least in part, on one or more of the feature of the sample data set and the structural characteristic of the sample data set, that at least a second portion of the data is uncategorical data;

generating second synthetic data; and packaging the second synthetic data into the synthetic data set.

* * * * *